United States Patent [19]

Horn

[11] Patent Number: 5,361,452
[45] Date of Patent: Nov. 8, 1994

[54] REDUCER CANNON CLEANING DEVICE

[76] Inventor: Roger Horn, 703 Oak St., Buchanan, Mich. 49107

[21] Appl. No.: 54,740

[22] Filed: Apr. 29, 1993

[51] Int. Cl.$^5$ .............................................. B08B 9/06
[52] U.S. Cl. ...................... 15/406; 55/302; 239/280
[58] Field of Search ............... 15/405, 406; 55/302; 134/167 C, 168 C; 166/312; 239/562, 567, DIG. 13, 95, 280, 578

[56] References Cited

U.S. PATENT DOCUMENTS

| | | |
|---|---|---|
| 473,987 | 5/1892 | Whitney . |
| 956,668 | 5/1910 | Becker ................... 15/406 |
| 1,388,854 | 8/1921 | Dezendorf ............... 15/406 |
| 1,473,467 | 11/1923 | Corne . |
| 1,661,931 | 3/1928 | Dolan . |
| 2,332,984 | 10/1943 | Brackeen . |
| 2,497,171 | 2/1950 | Jones et al. . |
| 2,551,126 | 5/1951 | Hersey, Jr. . |
| 2,564,402 | 8/1951 | MacArthur . |
| 2,673,986 | 4/1954 | Schaefer ................. 15/406 |
| 2,877,781 | 3/1959 | Lipp et al. . |
| 2,939,154 | 6/1960 | Gasser . |
| 3,000,036 | 9/1961 | DeBenedetti . |
| 3,189,934 | 6/1965 | Steinwedel ............. 15/406 |
| 3,665,547 | 5/1972 | Boylan . |
| 3,765,050 | 10/1973 | Van Allman et al. . |
| 3,789,861 | 2/1974 | Conn et al. . |
| 3,848,291 | 11/1974 | Morse ..................... 15/321 |
| 3,912,173 | 10/1975 | Robichaux .............. 239/567 |
| 4,063,312 | 12/1977 | Braillard . |
| 4,063,317 | 12/1977 | Santore ................... 15/406 |
| 4,349,073 | 9/1982 | Zublin .................. 134/167 C |
| 4,402,106 | 9/1983 | Mattson . |
| 4,492,003 | 1/1985 | Boylan . |
| 4,699,163 | 10/1987 | Baziuk ............... 239/DIG. 13 |
| 4,718,142 | 1/1988 | Wahlers . |
| 5,133,105 | 7/1992 | Littlefield . |
| 5,249,311 | 10/1993 | Rau ........................ 15/406 |

FOREIGN PATENT DOCUMENTS 951439  3/1964  United Kingdom .................. 15/406

OTHER PUBLICATIONS

BHA Brochure (Copyright Date 1991).
AIRCHOC Brochure.

*Primary Examiner*—David A. Scherbel
*Assistant Examiner*—Terrence R. Till
*Attorney, Agent, or Firm*—Barnes & Thornburg

[57] ABSTRACT

A reducer cannon cleaning device is provided having a hollow handle connected to a hollow conduit, wherein the handle is connected to a source of pressurized air such that the air may flow through the handle and the conduit. Attached to the conduit opposite the handle is a generally circular plate. A gasket is disposed against the plate and the cleaning device is then placed against a filter cage and bag unit. Bursts of air can then be blown through the cleaning device and into the filter cage and bag. Several attachments can also be used with the cleaning device, some of which may be attached to the cleaning device and placed within the filter cage and bag. The various attachments may include holes therein, positioned at pre-determined locations and angles. The attachments direct and focus the air exiting the conduit and entering the filter caging unit. Another attachment is a mechanical hand unit, which can be connected to the distal end of the conduit. The mechanical hand unit can be used to crush or deform a portion of the filter cage, such that the cage may be removed from the dust collecting unit.

24 Claims, 4 Drawing Sheets

REDUCER CANNON CLEANING DEVICE

BACKGROUND AND SUMMARY OF THE INVENTION

The present invention relates generally to devices which clean debris, dust and other particulate matter from filtering units. More particularly, the present invention relates to a pneumatic device used to individually clean filter cages and filter bags used in industrial filter systems.

Providing a clean environment is a problem which is currently drawing much attention; however, this problem has been facing manufacturers and other industrial shops for many years. Most every industrial plant and manufacturing facility, including steel mills, foundries, machine shops and other factories produce debris in the form of dust, slag, grinding dust, and the like. If this particulate matter is allowed to float freely into the atmosphere, the debris can add considerable pollutants to the air. Therefore, most plants include a mechanism whereby dirty air is passed through a filtration system. The debris carried by the air is trapped in the filtration system and the clean air is allowed to escape into the ambient. The dust and debris collected by the filter can then be disposed of properly.

A typical filtration mechanism which is used to collect debris is shown in FIG. 1. Air which has collected dirt and debris is allowed to pass into the filtration system, where the dirt can be trapped and collected. The clean air is then allowed to pass into the ambient. As shown in FIG. 1, a typical filtration device will include a dust collecting unit, indicated by the reference letter A. The dust collecting unit will typically be a large enclosure, and may have dimensions as large as 40 feet by 120 feet, and be 60 feet in height.

As can be seen in FIG. 1, the dust collecting unit includes a plurality of filter bags suspended therein. The filter bag may typically be several inches in diameter, and up to 40 feet in length. The filter bag is typically constructed of a woven fabric material. As the dirty air passes through the filter bags, the debris is collected in the fabric. The clean air is then allowed to escape the baghouse, and the debris is maintained in the filter bag fabric.

The filter bags may be housed within the dust collecting unit in numerous ways. In one arrangement, a cell plate or tubesheet extends across the top of the dust collecting unit, or baghouse. A mesh wire cage is connected to the cell plate and hangs within the baghouse. The end of the mesh cage opposite the cell plate is suspended in air, hanging over the hopper. A filter bag is inserted over each cage, and extends the entire length of the cage. Dirty air enters the baghouse adjacent the hopper, and is allowed to circulate around the filter bags and cages. This type of system is known as an outside collection system, because the particulate matter trapped in the air is collected on the exterior, or outside surface of the filter bag. In some outside collection system units, the dirty air is also allowed to circulate through the interior of the cage and bag, and thus debris is collected on both the inside and outside surfaces of the bag. This type of arrangement is shown in FIG. 1.

A second manner in which the filter bags may be housed in the baghouse is through the use of a spring-tensioning mechanism. Instead of a cell plate near the top of the baghouse, the arrangement includes a plurality of beams which extend across the width of the dust collecting unit. Spaced along the beams are springs, which support the bags hanging from the beams. Opposite the beams, the baghouse includes a cell plate just above the hopper. The cell plate includes a thimble for each bag. The bottom of the bag is secured to the thimble, and thus the bag is maintained in a substantially vertical position.

In spring-tensioning systems, air enters the dust collecting unit near the hopper, and travels into the filter bags through the thimbles in the cell plate. As the air travels through the filter bag, the debris is captured and collected in the fabric of the bag. This type of collection unit is known as an inside collection unit, because the particulate matter is collected on the inside surface of the bag.

Known dust collecting units are typically either positive pressure units or negative pressure units. In a positive pressure baghouse, a fan pushes the dirty air through the baghouse. In a negative pressure baghouse, a fan located on the clean air side of the filters pulls the dirty air past the filter bags.

As the air passes the filter bags, the particulate matter and debris are captured in the fabric, and the clean air is allowed to escape. Thus, the atmosphere is not polluted with potentially harmful debris. However, over time, particle agglomeration can reduce the filtering capability of the filter bags. Particle agglomeration occurs when multiple particles join or are clustered together by surface tension to form larger particles. Such particles may be held together by moisture, static charge or particle architecture. Particle agglomeration is particularly prevalent in wet process dust collecting units. These units spray a water mist into the particulate-laden airstream. The moisture increases particle weight and causes particle agglomeration, allowing the heavier debris to drop out of the air.

However, the moistened dust and dirt can also collect on the filter cages, filter bags, and surrounding areas. When this occurs, particle agglomeration can cause corrosion and deterioration of the metal components of the dust collecting unit. The filter cage and cell plate are particularly susceptible to this corrosion. If the corrosion is extreme, large gaps or holes may be formed through which dirty air may pass. In these instances, the dirty air is not exposed to filtration and passes directly into the atmosphere.

Particle agglomeration can also reduce the effectiveness of the filter bag. If the filter bag becomes clogged, it will be unable to trap and collect the particulate from the passing air. Furthermore, particle agglomeration on the filter bag can cause blinding. Blinding is a fabric blockage caused by dirt or debris not being discharged, and can result in a reduced gas flow or increased pressure drop across the media.

Over time, the particle agglomeration matter solidifies, forming a hardened material known as "dustcake" or "hardcake". Hardcake bonds to the filter cage, filter bags, cell plate and surrounding areas. The hardcake can corrode the metal components, and deteriorate the fabric of the filter bag. Hardcake can accumulate on and around the cell plate and thimble, causing deterioration and corrosion. This weakens and reduces the effectiveness of the seal between the filter bag and the cell plate, and thus can also reduce the effectiveness of the filtering capabilities of the unit. Furthermore, excessive amounts of hardcake can make removal of the filter bag and cage difficult.

To limit the deteriorative effects of the particulate matter collected in the baghouse, it can be beneficial to clean the system. One known method of removing hardcake material is by repeatedly striking the material with a hammer or similar instrument. Sandblasters have also been used to clean hardcake from dust collecting units. Using a hammer or similar instrument, however, can cause additional harm to the cage, cell plate and other areas being cleaned. Furthermore, if the hardcake material has caused corrosion to the surrounding metallic components, striking them with a hammer can cause even greater damage. Thus, it is beneficial to loosen and remove hardcake material without further damaging the metallic components to which the hardcake material is attached.

In addition to hammers and sandblasters, blowpipes have been used to clean debris from filter cages and bags. As shown in FIG. 2, a blowpipe extends across the opening of several successive filter cages, substantially orthogonal to the longitudinal axis of each filter cage and bag. The blowpipe includes several orifices therein, one corresponding to each cage. Pressurized air is conveyed through the blowpipe and is allowed to escape out the orifices and into each cage. The blowpipe is designed to supply pressurized air to the filter cage and bag, thus removing the debris from the bag. Some blowpipe units include a nozzle which extends from each orifice up to the opening of the cage. Some cage units additionally include a venturi device in the cage adjacent the cell pipe. A venturi is typically a conically-shaped device which creates a negative pressure at the top of the venturi to help pull additional air down into the filter cage and bag. In these known blowpipe systems, several pulses of pressurized air may be directed into the filter cage to clean the debris from the cage and bag.

These known cleaning arrangement are inadequate to fully clean the filter cage and filter bag for several reasons. First, the pressure of the air in the blowpipe is greatest near the source of pressurized air, and weakest opposite the source. The air being dispersed into the cages far from the air source is thus of a lower pressure than the air in the blowpipe near the air source. The air under less pressure may be ineffective at removing dirt and debris, and especially dustcake, from the filter cages and bags which are further removed from the source of pressurized air.

Second, the known systems are ineffective at cleaning the entire length of the filter cage and bag. A typical filter cage and bag unit may be 40 feet in length. The burst or pulse of air shot into one end of the cage may clean debris from a longitudinal portion of the bag near the blowpipe, but not near the end of the bag opposite the blowpipe. As the air flows down the length of the cage and bag, its pressure is reduced, and it is ineffective at cleaning the bottom portions of the bag. Thus, these portions of the filter bag and cage remain clogged with debris.

Third, known blowpipe systems are stationary, and cannot be used to clean other areas of the dust collecting unit. For example, particle agglomeration may accumulate near the thimble area and on the cell plate, on and around doors, vents, ducts, dampers, fans, hoppers, tensioning assemblies, and other areas. The known blowpipe systems are directed only into the filter cage and bag, and thus cannot be used to clean these areas.

The known blowpipe systems are particularly ineffective at cleaning the surrounding areas of a dust collecting unit utilizing a spring-tensioning mechanism of suspending the filter bags. A filter bag fully laden with slag, dust and particle agglomeration can cause damage to the tensioning system. The weight of the particle agglomeration collected on the bag can be in excess of 175 pounds. This excess weight can damage the spring supporting the bag. Thus, a clean bag reduces the tension on the spring, and extends its life. Furthermore, hardcake can collect on and around the spring-tensioning unit. This can restrict the free movement of the system. Removing the hardcake material from around the spring frees the tensioning unit, and further extends its life.

In baghouses where the filter cage and bag are attached to a top cell plate, hardcake material will often collect on the cell plate, restricting access to both the filter cage and the filter bag. Thus, when the filter bag is full, it may be difficult to remove the bag from the dust collecting unit. It is therefore advantageous to be able to remove hardcake material from the cell plate adjacent the connection to the filter cage and filter bag. Furthermore, if the filter cage and bag are too heavy to remove from the cell plate, or are too deteriorated for further use, it may be beneficial to be able to remove them from the cell plate.

Accordingly, an object of the present invention is to provide a cleaning device which is able to clean debris and dirt from the entire length of a filter cage and filter bag.

Another object of the present invention is to provide a cleaning device which is able to break hardcake material free from a filter cage, filter bag, and surrounding areas of a dust collecting unit.

A further object of the present invention is to provide a cleaning device which is portable, such that it may be used to clean surrounding areas of a dust collecting unit, such as the cell plate, thimbles, doors, ducts, and the like.

Yet another object of the present invention is to provide a cleaning device which cleans both the inside and the outside surfaces of a filter bag.

Yet another object of the present invention is to provide a cleaning device which aids in the removal of a filter cage and filter bag from the cell plate when the bag is too heavy for normal removal.

These and other objects are attained by a reducer cannon cleaning device. The cleaning device of the present invention is portable, and can be used by a single individual. The device includes a handle which is substantially hollow. Attached to the handle is a source of pressurized air. Opposite the pressurized air, connected to the handle, is a substantially hollow conduit. By controlling a ball valve located on the handle, pressurized air may enter the hollow handle and flow into the conduit.

Mounted to the conduit, the cleaning device includes a diaphragm, connected to a solenoid. The solenoid is connected to a trigger mounted on the handle. A user can depress the trigger, activating the solenoid, and thereby positioning the diaphragm in an open or closed position. In a closed position, the pressurized air is prevented from flowing out of the conduit. In an open position, the air is allowed to exit the conduit.

Attached to the distal end of the conduit is a plate. The plate is a substantially circular disc, and is designed to fit over the hole of a filter cage and filter bag. A gasket is positioned between the plate and the cell plate or tubesheet. The gasket is a two-part gasket, having a substantially rigid outer surface and a pliable inner core. The gasket forms to the shape of the ceil plate, filter cage and filter bag, such that air does not escape adjacent the cell plate.

In use, the cleaning device is positioned about a filter cage and filter bag such that the plate covers the opening to the cage. The user can depress the trigger, thereby allowing pressurized air to flow through the cleaning device and out the end of the conduit. The gasket ensures that air does not escape around the cell plate. The air may be released in short pulses, or in longer continuous blasts.

Because the reducer cannon cleaning device is portable, it can also be used to clean areas adjacent the filter cage and filter bag. The cleaning device can be pointed at areas desired to be cleaned, such as cell plates, spring-tensioning systems, thimbles, ducts and the like. Pulses of air can be directed towards particle agglomeration at these locations, loosening hardcake and freeing dirt and debris.

The present invention also includes a series of attachments for use when cleaning a filter cage and bag. One attachment is a substantially cylindrical, hollow pipe. A plurality of holes are placed in the pipe at pre-determined locations and pre-determined angles. The pipe is attached to the distal end of the conduit, and can be placed inside the filter cage and bag. Air traveling through the conduit enters the attachment and escapes through the holes.

A second attachment includes a substantially cylindrical, hollow adapter tube. In this attachment, the tube does not include holes along the longitudinal sides, but instead includes a cap on its distal end. The cap has a plurality of holes therein, which can be positioned and angled as desired.

A third attachment for the cleaning device includes a substantially shortened cylindrical compact nozzle which can be attached to the conduit. At the distal end of the nozzle is a bell reducer, which directs and focuses the air as it leaves the attachment.

A fourth attachment which can be used in conjunction with the present invention is a cage crushing device. When hardcake and dustcake have built up around the cell plate and cage, it may be desired to remove the cage from the cell plate. A mechanical hand, including spaced apart mechanical fingers, can be attached to the cleaning device of the present invention. The mechanical hand is placed about the top of the filter cage. The user actuates the trigger on the cleaning device, thus supplying air to the mechanical hand. The fingers on the mechanical hand contract in response to the flow of air, and thereby crush the top of the filter cage. Once removed from the cell plate, the filter cage and bag are dropped from the baghouse into the hopper.

DETAILED DESCRIPTION OF THE PREFERRED EMBODIMENTS

Figures 3, 4, 5:
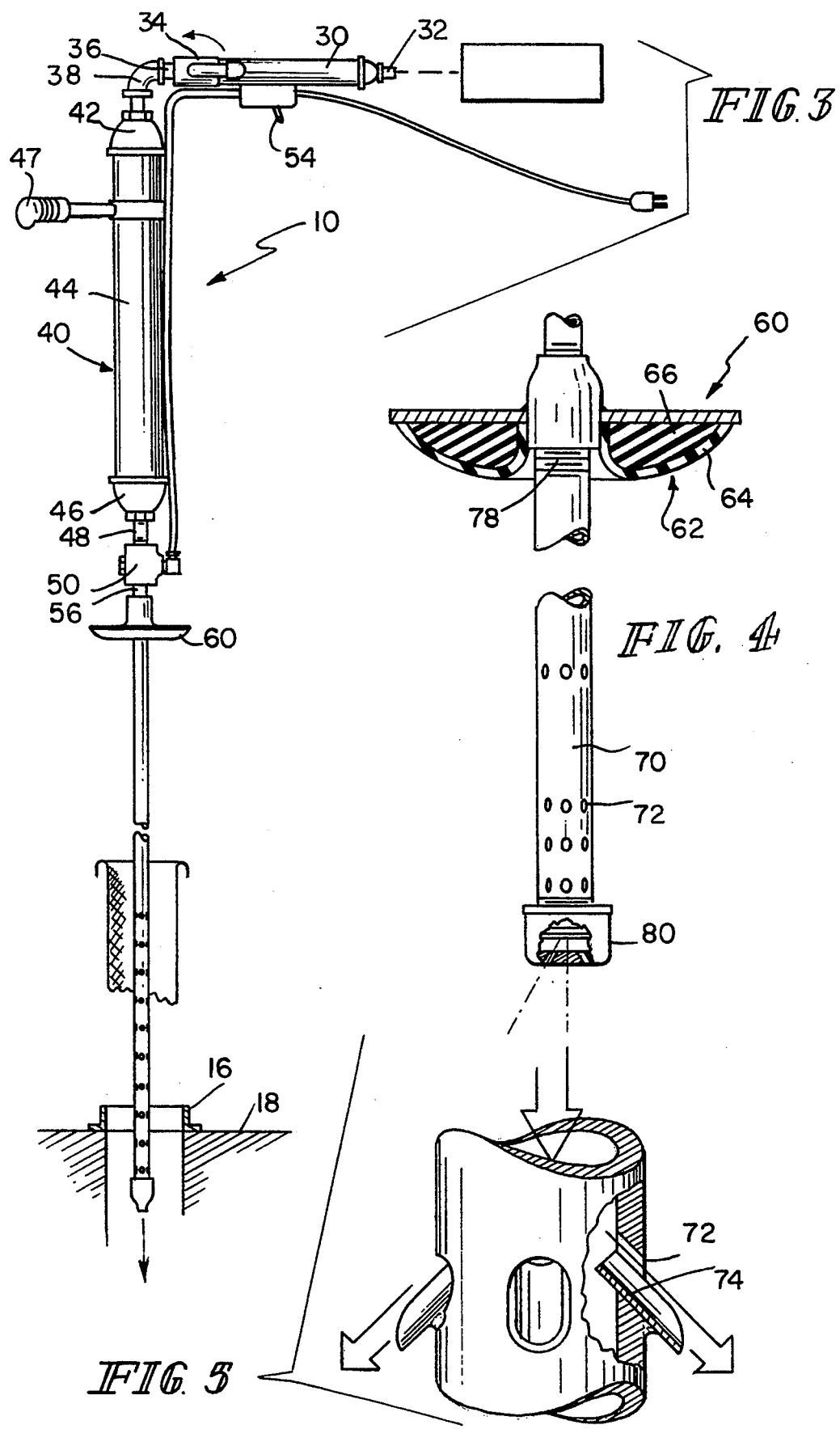
FIG. 3 shows a side view of an illustrative embodiment of the reducer cannon cleaning device of the present invention.
FIG. 4 shows and the plate and gasket arrangement which may be used in conjunction with the present invention, and an illustrative embodiment of a first attachment which may be used with the cleaning device of the present invention.
FIG. 5 is a partial view of an attachment which can be used with the cleaning device of the present invention.

Referring now to FIGS. 3-10, illustrative embodiments of the present invention are shown. In the various figures, the reducer cleaning device of the present invention is generally referred to by the reference numeral 10. Cleaning device 10 is particularly designed to individually clean a filter cage and filter bag in a baghouse. However, as cleaning device 10 is portable, it may be readily used to clean cell plates, thimbles, ducts, vents and other surrounding areas of the baghouse. For illustrative purposes, cleaning device 10 is shown in FIG. 3 in conjunction with a typical filter cage and filter bag arrangement.

Figure 1:
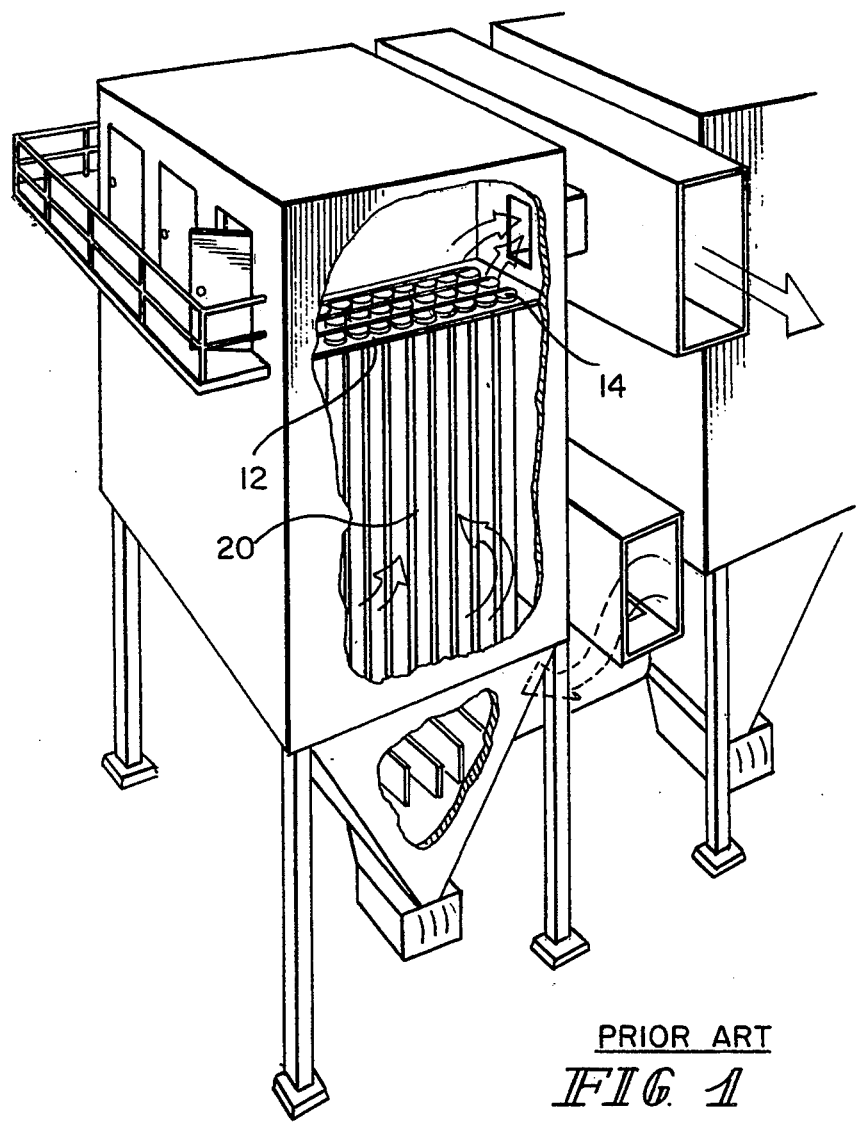
FIG. 1 shows a typical, known dust collecting unit, including a typical baghouse having filter cages and filter bags suspended therein.
Figure 2:
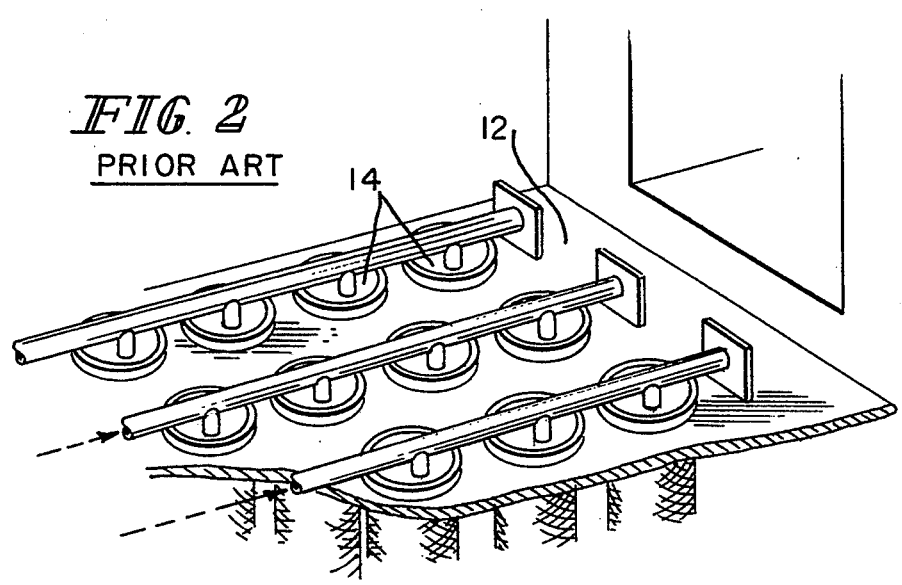
FIG. 2 shows a typical, known blowpipe arrangement used to clean debris and dust from a filter cage and bag unit.

As shown in FIG. 1, a typical baghouse may include cell plate 12, having a plurality of holes 14 therein. Each hole 14 includes flange 16 thereabout, substantially surrounding the perimeter of the hole. Flange 16 is raised slightly above the surface of cell plate 12. Attached to cell plate 12 and flange 16 and suspended therefrom are a plurality of filter cages 18. One filter cage 18 is attached to cell plate 12 adjacent each hole 14. As is commonly understood in the industry, a filter bag 20 may be disposed within each filter cage 18 to collect debris and dust flowing through the baghouse.

As shown in FIG. 3, cleaning device 10 includes handle 30. Handle 30 is a generally elongate, substantially hollow tube. At one distal end of handle 30 is coupling 32. Coupling 32 allows an air hose or other source of pressurized air (not shown) to be connected to cleaning device 10. Opposite coupling 32, handle 30 includes ball valve 34. Ball valve 34 enables a user to control the flow of air exiting handle 30.

Adjacent ball valve 34, handle 30 is connected to first nipple 36. First nipple 36 is attached to elbow 38 which transitions orthogonally from the longitudinal axis of handle 30. Opposite first nipple 36, elbow 38 is attached to conduit 40. Conduit 40 is also substantially elongate and hollow, and comprises several individual elements.

At the connection to elbow 38, conduit 40 includes bell reducer 42. Bell reducer 42 reduces the pressure of air passing therethrough, as its diameter increases in size as it extends away from elbow 38. Opposite elbow 38, bell reducer 42 is connected to shell 44. Shell 44 is generally cylindrical in shape, and has a substantially constant diameter throughout. Attached to shell 44 opposite bell reducer 42 is bell reducer 46. Bell reducer 46 is inverted, such that its diameter narrows as it extends away from shell 44. Thus, air entering bell reducer 46 exits the reducer under increased pressure.

Bell reducer 42, shell 44 and bell reducer 46 are all made of a structurally rigid material, such as steel or aluminum. As shown in FIG. 3, bell reducer 42 and bell reducer 46 are 3×1 reducers. Thus, the diameter of the reducer at it widest point is approximately three times the diameter at its most narrow point. As illustrated, shell 44 has a diameter of approximately three inches, and is approximately 24 inches in length. However, it should be well understood that the dimensions of the various components of the present invention may be modified to suit particular applications. Grip 47 is connected to the exterior of shell 44, and extends substantially orthogonally therefrom. Grip 47 provides the user another location by which to hold cleaning device 10.

Attached to the narrow opening of bell reducer 46 is second nipple 48. Opposite bell reducer 46, second nipple 48 is attached to diaphragm 50. Diaphragm 50, as illustrated, is approximately 1-2 inches in diameter. Diaphragm 50 is able to regulate the flow of air passing therethrough. Attached to diaphragm 50 is solenoid 52. Solenoid 52 is connected to trigger 54, which is mounted to handle 30. As is well known, solenoid 52 can be actuated by depressing trigger 54. Solenoid 52 controls diaphragm 50, and allows the diaphragm to be positioned between open and closed positions. In the closed position, diaphragm 50 blocks conduit 40, such that air is not allowed to pass therethrough. In an open position, pressurized air traveling through conduit 40 is allowed to pass therethrough.

Opposite diaphragm 50, conduit 40 includes third nipple 56 and plate 60. Plate 60 is a generally concave, generally circular disc, having a diameter of approximately 6 inches. Plate 60 is designed to fit over hole 14 in cell plate 12 when cleaning device 10 is used to clean filter cage 18 and filter bag 20. Gasket 62 positioned between plate 60 and cell plate 12 to ensure that air does not leak adjacent the cell plate. Gasket 62 includes outer surface 64 and inner core 66. Outer surface 64 is a rigid, hard surface, and may be formed of a material such as caulking. Inner core 66 is pliable and is able to form to the shape of filter bag 20 and filter cage 18. A suitable material for use in inner core 66 is uncured caulking.

In use, plate 60 is positioned over hole 14 in cell plate 12. Pressurized air is allowed to enter handle 30 and, by adjusting ball valve 32, conduit 40. When trigger 54 is actuated, solenoid 52 opens diaphragm 50, and a pulse of pressurized air bursts out of conduit 40 and into hole 14. Gasket 62 ensures that air will not escape near the cell plate. This pulse of air loosens hardcake material from the filter bag and cage, and also cleans other dirt and debris from the debris collecting unit. The amount of air released through conduit 40 can be controlled by trigger 54.

Cleaning device 10 of the present invention also includes several attachments which focus and direct the pressurized air as it leaves conduit 40. One such attachment is pipe 70. Pipe 70, as illustrated in FIG. 4, is a generally elongated, cylindrical member. Pipe 70 is substantially hollow such that air entering the pipe may pass therethrough. Pipe 70 may be made of a sturdy, rigid material, such as steel or aluminum. Pipe 70 includes a plurality of holes 72 therein. Holes 72 may be placed at various predetermined positions along pipe 70. For example, holes 72 may be positioned along pipe 70 in longitudinal rows. In another illustrative embodiment, holes 72 may be spaced at pre-determined intervals about the perimeter of pipe 70. In the illustrative embodiment shown, pipe 70 includes holes 72 positioned in longitudinal rows, such that the rows are spaced apart about the periphery of the pipe. As shown, holes 72 do not extend the entire length of pipe 70, but only along a longitudinal portion of the member. It should be well understood that the positioning of holes 72 on pipe 70 may be modified, and the positioning of holes 72 is not to be taken as a limitation of the present invention.

The dimensions of pipe 70 may be modified to suit a particular filter cage 18 and filter bag 20. In one illustrative embodiment, pipe 70 has a diameter of approximately 1½ inch, and is approximately 75 inches in length. In pipe 70 of these approximate dimensions, each hole 72 may be approximately 7/16 inch in diameter.

Each hole 72 may be angled from the horizontal. As can be seen in FIG. 5, hole 72 is angled downward at approximately 45° from the horizontal. Hole 72 also includes tail 74 which extends into the interior of pipe 70, and lip 76 which extends outside the exterior of pipe 70. The angle of hole 72, together with tail 74 and lip 76 help direct air flowing through pipe 70 out the holes.

At one distal end, pipe 70 includes attachment means 78. Attachment means 78 allows pipe 70 to be removably engageable with conduit 40. As shown, attachment means 78 includes a series of threads, allowing pipe 70 to be threadably attached to conduit 40. Opposite attachment means 78, pipe 70 includes cap 80. Cap 80 blocks the end of pipe 70, so that no air may escape therethrough. In some applications, cap 80 may be removed, allowing air to pass through the attachment.

Another illustrative attachment which can be removably attachable to cleaning device 10 is adapter 90. Adapter 90 is a rigid, cylindrical hollow pipe member, and can be made of material such as steel or aluminum. The dimensions of adapter 90 may be modified to suit a particular application. However, in an illustrative embodiment, adapter 90 has a diameter of approximately ¾ inch, and is approximately 5 inches in length.

Figure 6:
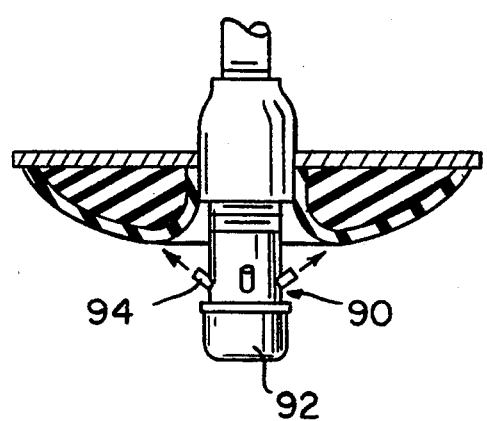
FIG. 6 is a perspective view of a second illustrative attachment which may be used with the cleaning device of the present invention.

Attached to one end of adapter 90 is cap 92. Cap 92 prevents air from escaping through the end of adapter 90. Adjacent the position where cap 92 is connected to adapter 90, adapter 90 includes a plurality of vents 94 therein. As is shown in FIG. 6, vents 94 are angled upwardly from the vertical. In the illustrative embodiment shown, each vent 94 is angled upward at approximately 45° from the horizontal.

Air exiting conduit 40 flows through bell reducer 42 and into the body of adapter 90. The air is allowed to escape through vents 94, being directed upwardly towards cell plate 12. This allowes dirt and debris which has collected on the underside of the cell plate to be removed.

Figure 7:
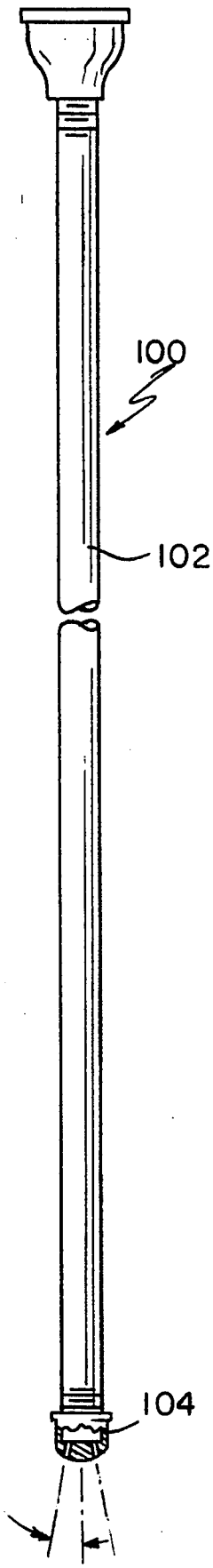
FIG. 7 is a side view of a third illustrative embodiment of an attachment which can be used with the cleaning device of the present invention.
Figure 8:
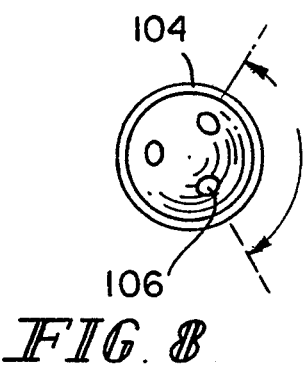
FIG. 8 is a bottom view of the attachment shown in FIG. 7.

Another illustrative attachment which can be used with the present invention is shown in FIGS. 7 and 8. Nozzle 100 includes body 102 and cap 104. Air exiting conduit 40 enters body 102 and is directed and focused through cap 104.

Cap 104, as is shown in FIG. 8, includes three holes 106 therein. Holes 106 are shown spaced apart, at angles of approximately 120°. Furthermore, holes 106 are angled slightly from the vertical. Thus, air entering body 102 exits nozzle 100 through holes 106 and cap 104. The air is directed at an angle from the vertical, and thus is able to clean debris from the surrounding filter or cage.

As can be readily understood, cleaning device 10 equipped with pipe 70, adapter 90 or nozzle 100 may be used to break up hardcake material from filter cage 18 and filter bag 20. When it is desired to use one of the attachments with cleaning device 10, the attachment is connected to conduit 40. The attachment is then inserted into filter cage 18 and filter bag 20 until gasket 62 contacts cell plate 12, filter cage 18 and filter bag 20.

A user controls the flow of air through cleaning device 10 by actuating trigger 54. When it is desired to release pressurized air into the filter cage and filter bag, trigger 54 is depressed. This operates solenoid 52, and opens diaphragm 50. Air is thus allowed to travel through handle 30, conduit 40, and into the attachment. The air then escapes the attachment, and blows the debris from filter cage 18 and filter bag 20.

Although the various attachments have been described in detail, it should be well understood that the present invention is not limited to the precise structural embodiments discussed herein. For example, the placement of holes along the exterior of the body of an attachment may be modified to suit particular application. Furthermore, various cap designs may be used with each of the various attachments.

Another attachment which can be used with the present invention is shown, for illustrative purposes, in Fag. 9. Cage crusher 110 is a mechanical hand unit. Cage crusher 110 includes attachment mechanism 112, which allows the crusher to be removably connected to conduit 40. Cage crusher 110 includes base 114, which extends from attachment mechanism 112. Base 114 is generally in the shape of an inverted "U". Attached to base 114 are four fingers 116. Fingers 116 are spaced apart in a generally rectangular pattern. Each finger 116 is able to translate with respect to base 114. Opposing pairs of finger 116 translate relative to one another by telescopically sliding within sleeve 118. A sleeve 118 is located on either side of attachment mechanism 112. Air enters attachment mechanism 112, and splits into two paths. One path of airflow enters base 114, travels into sleeve 118, and into each finger 116. Air is then allowed to escape each finger 116 through escape hole 120 located at one end of each finger.

A second path of air is directed from attachment mechanism 112 to a solenoid (not shown). This solenoid activates opposing pairs of fingers 116. In this manner, opposing pairs of fingers 116 are movable relative to one another. In an expanded position, opposing pairs of fingers 116 may be approximately 6 inches apart, once activated. In a rest position, opposing pairs of fingers 116 may be approximately 3 inches apart.

Figures 9, 10:
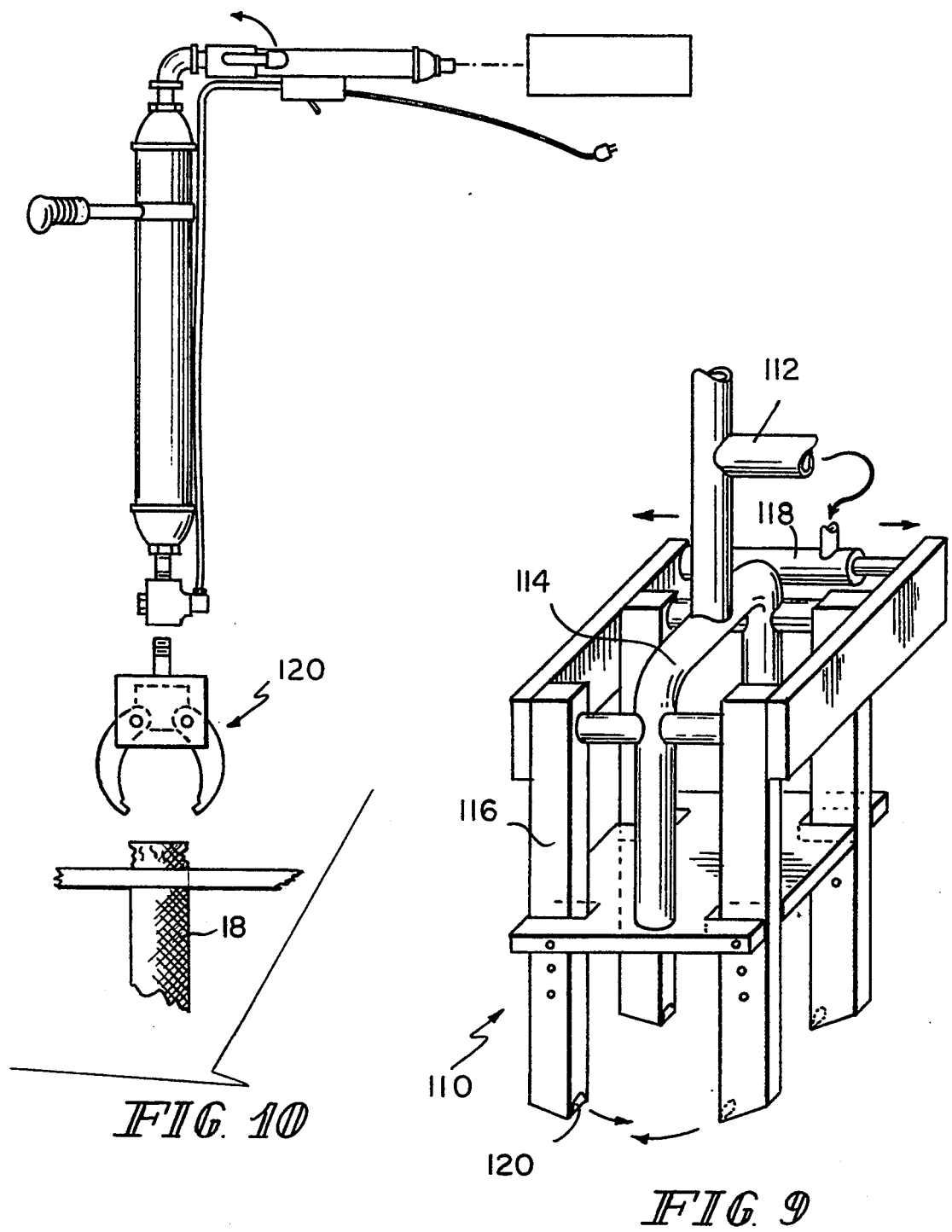
FIG. 9 is a perspective view of an illustrative embodiment of a cage crushing attachment which can be used with the cleaning device of the present invention.
FIG. 10 is a side view of a second illustrative embodiment of a cage crushing attachment shown adjacent a cleaning device of the present invention.

FIG. 10 shows another illustrative embodiment of a cage crushing device, indicated by the reference numeral 120. Cage crusher 120 is another illustrative embodiment of a mechanical hand unit, and is activated and operates in approximately the same manner as cage crusher 110.

Cage crusher 110 may be used as an attachment with cleaning device 110 when it is desired to remove filter cage 18 from cell plate 12. Occasionally, hardcake material will build up around hole 14 and cell plate 12 and make it difficult to remove filter bag 20 from filter cage 18. This hardcake build-up can cause excessive corrosion to the filter cage. In these instances, it may be desired to remove filter cage 18 from cell plate 12, and replace it with a new cage.

To remove filter cage 18 from cell plate 112, cage crusher 110 can be attached to conduit 40. Fingers 116 are positioned about the perimeter of flange 16 surrounding hole 14. By actuating trigger 54, bursts of pressurized air are directed through conduit 40 and into base 114, causing fingers 116 to translate towards one another in a generally inward direction. This process may be repeated, until fingers 116 crush flange 16 and adjacent portions of filter cage 18, releasing the cage from cell plate 12. Filter cage 18 and filter bag 20 are then allowed to drop into the hopper below the baghouse, and they can be removed through the hopper doors.

From the preceding description of the preferred embodiments, it is evident that the objects of the invention are attained. Although this invention has been described and illustrated in detail, it is to be clearly understood that the same is by way of illustration only and is not to be taken by way of limitation. Therefore, the spirit and scope of the invention are to be limited only by the terms of the appended claims.

What is claimed is:

1. A device for cleaning debris from a debris collecting unit, comprising:
   a handle for allowing a user to hold and control said device;
   a generally hollow conduit connected to said handle;
   a source of pressurized air, said source including a means of providing said air to said device, such that said air is allowed to enter said conduit adjacent said handle and exit a distill end of said conduit opposite said handle;
   said conduit including a bell reducer for directing and focusing the flow of air through said conduit;
   a generally circular plate attached to said conduit opposite said handle, said plate being positionable adjacent said collecting unit such that said air entering said conduit passes there through and exits said conduit adjacent said plate and enter said collecting unit to clean said debris therefrom; and
   control means for regulating the flow of air through said conduit; and at least one attachment extending within said collecting unit has been added.

2. The device according to claim 1 including a gasket disposed adjacent said plate for sealing the connection between said plate and said collecting unit.

3. The device according to claim 2 wherein said gasket is a two-part gasket, including a substantially rigid outer surface and a pliable inner core.

4. The device according to claim 1 including a solenoid switch attached to said conduit for regulating the flow of air through said conduit.

5. The device according to claim 1 further including a plurality of attachments removably attachable to said conduit opposite said handle, said attachments extending beyond said plate opposite said conduit for focusing and directing the flow of air after said air exits said conduit.

6. The device according to claim 5 wherein one said attachment includes a generally elongate, hollow pipe having a plurality of holes therein spaced about the periphery of said pipe such that air exiting said conduit and entering said pipe is allowed to exit said pipe through said holes, said holes for directing the air exiting therefrom.

7. The device according to claim 6 wherein said pipe includes said holes only in predetermined longitudinal portions of said pipe.

8. The device according to claim 6 wherein said holes are angled from the horizontal.

9. The device according to claim 8 wherein said holes are angled downwardly at approximately 45° from the horizontal.

10. The device according to claim 6 wherein said holes are spaced in longitudinal rows, said rows being spaced apart at 90° intervals about the periphery of said pipe.

11. The device according to claim 6 wherein said holes include a lip thereon, such that said lip protrudes beyond the exterior surface of said pipe.

12. The device according to claim 6 wherein said holes include a tail associated therewith, said tail protruding inwardly from said hole towards the interior of said pipe, and extending beyond the interior surface of said pipe.

13. The device according to claim 5 wherein one said attachment is a generally elongate, hollow adapter pipe having a cap on a distal end thereof, said cap including a plurality of holes therein, such that air exiting said conduit and entering said pipe is allowed to escape said pipe through said holes.

14. The device according to claim 13 wherein said cap includes three holes therein, said holes being offset from the center line of said cap, said holes being spaced apart at 120° intervals.

15. The device according to claim 14 wherein said holes are angled from the vertical at an angle of approximately 45°.

16. The device according to claim 5 wherein one said attachment includes a generally elongate, hollow compact nozzle having a reducer at a distal end thereof, said reducer having an orifice therein, wherein said orifice has a diameter smaller than the diameter of said nozzle, such that air exiting said conduit and entering said nozzle is allowed to escape said nozzle through said orifice.

17. A device for cleaning debris from a debris collecting unit, said debris collecting unit including a plurality of generally elongate cages being suspendedly connected to a cell plate, said collecting unit including a filter bag disposed within each said cage, said device comprising:

a handle for allowing a user to hold said device;

a generally hollow conduit connected to said handle;

a source of pressurized air having transport means for providing said pressurized air to said device, such that said air is allowed to enter said conduit adjacent said handle and exit said conduit opposite said handle;

at least one valve attachable to one of said handle and said conduit, said valve for regulating the flow of air therethrough;

a solenoid switch connected to said conduit for controlling the flow of air exiting said conduit;

a trigger connected to said handle for actuating said solenoid switch;

said conduit including a bell reducer for directing and focusing the flow of air through said conduit; and wherein said handle is substantially hollow, such that said pressurized air is allowed to enter said handle and is controllably allowed to enter said conduit by actuating said valve, and wherein said air then passes through said conduit and through said bell reducer and is allowed to exit said conduit by actuation of said solenoid switch by said trigger.

18. The device according to claim 17 including a generally circular plate attached to said conduit opposite said handle, said plate being generally flat, said plate being removably attachable to said collecting unit such that air exiting said conduit passes through said plate and enters said collecting unit to clean said debris therefrom.

19. The device according to claim 17 including a generally elongate, hollow pipe removably attached to said conduit opposite said handle, said pipe having a plurality of holes therein spaced about the periphery of said pipe, such that air exiting said conduit and entering said pipe is allowed to escape said pipe through said holes.

20. The device according to claim 19 wherein said pipe includes said holes only along a predetermined longitudinal portion of said pipe.

21. The device according to claim 19 wherein said holes are angled from the horizontal.

22. The device according to claim 17 including a generally elongate, hollow pipe attached to said conduit opposite said handle, said pipe having a cap on a distal end thereof, said cap including a plurality of holes therein, such that air exiting said conduit and entering said pipe is allowed to escape said pipe through said holes.

23. The device according to claim 22 wherein said cap includes three holes therein, said holes being offset from the center line of said cap and being space apart at approximately 120° intervals, said holes being angled from the vertical at an angle of approximately 22½°.

24. The device according to claim 17 including a generally elongate hollow pipe being removably attached to said conduit opposite said handle, said pipe having a bell reducer at a distal end thereof, said bell reducer having an orifice therein such that said orifice has a diameter substantially smaller than the diameter of said pipe, such that air exiting said conduit and entering said pipe is allowed to escape said pipe through said orifice.

* * * * *